United States Patent
Creamer et al.

(10) Patent No.: US 8,085,919 B2
(45) Date of Patent: Dec. 27, 2011

(54) METHOD AND SYSTEM FOR TEMPORARILY PROVISIONING A TELEPHONE SERVICE FEATURE FOR A SUBSCRIBER

(75) Inventors: Thomas E. Creamer, Boca Raton, FL (US); Joseph H. McIntyre, Austin, TX (US); Victor S. Moore, Lake City, FL (US); Glen R. Walters, Hollywood, FL (US)

(73) Assignee: International Business Machines Corporation, Armonk, NY (US)

( * ) Notice: Subject to any disclaimer, the term of this patent is extended or adjusted under 35 U.S.C. 154(b) by 830 days.

(21) Appl. No.: 12/127,248

(22) Filed: May 27, 2008

(65) Prior Publication Data
US 2008/0226048 A1    Sep. 18, 2008

Related U.S. Application Data

(63) Continuation of application No. 10/039,153, filed on Jan. 3, 2002, now Pat. No. 7,430,289.

(51) Int. Cl.
*H04M 3/42* (2006.01)
(52) U.S. Cl. .............. 379/201.12; 379/201.01
(58) Field of Classification Search .......... 379/201.01–201.12, 207.01–207.16, 379/210.01–210.02, 212.01, 215.01, 219, 379/220.01, 221.01
See application file for complete search history.

(56) References Cited

U.S. PATENT DOCUMENTS

| | | | |
|---|---|---|---|
| 5,455,856 A | 10/1995 | Story | |
| 5,619,562 A | 4/1997 | Maurer et al. | |
| 5,625,887 A | 4/1997 | Cassidy et al. | |
| 5,734,710 A * | 3/1998 | Hirth et al. ............ 379/229 | |
| 5,778,315 A | 7/1998 | Proietti | |
| 5,819,173 A | 10/1998 | Lawrence et al. | |
| 5,845,207 A | 12/1998 | Amin et al. | |
| 5,943,403 A | 8/1999 | Richardson, Jr. et al. | |
| 6,064,666 A | 5/2000 | Willner et al. | |
| 6,122,292 A | 9/2000 | Watanabe et al. | |
| 6,188,757 B1 | 2/2001 | Malik | |
| 6,208,726 B1 | 3/2001 | Bansal et al. | |
| 6,310,946 B1 | 10/2001 | Bauer et al. | |

(Continued)

FOREIGN PATENT DOCUMENTS

DE    101 45 987.4    *   9/2001

*Primary Examiner* — William Deane, Jr.
(74) *Attorney, Agent, or Firm* — Novak Druce + Quigg LLP

(57) ABSTRACT

The invention provides a method and system for temporarily provisioning a telephone service feature. At the request of a calling or called party, a telephone service feature to be temporarily provisioned can be identified. Once identified, the telephone service feature can be provisioned and activated to handle the telephone service feature. Upon completion of the call, the requested telephone service is deactivated. In order to activate the requested telephone service feature, system resources can be allocated to support the identified telephone service feature. The allocation of system resources can include reserving a pool of resources for activating the identified telephone service feature. For example, a pool of line interface circuits may be reserved specifically for providing temporary provisioning of the telephone service feature for subscribers. An available resource capable of processing the identified telephone service feature can be selected from the pool of resources. The selection of an available resource can include multiplexing the available resource onto a conduit that bears existing service for the subscriber for which the telephone service feature is being provisioned.

15 Claims, 4 Drawing Sheets

U.S. PATENT DOCUMENTS

| | | |
|---|---|---|
| 6,385,311 B1 | 5/2002 | Bauer et al. |
| 6,393,117 B1 | 5/2002 | Trell |
| 6,504,912 B1 | 1/2003 | Glossbrenner |
| 6,529,729 B1 | 3/2003 | Nodoushani et al. |
| 6,628,934 B2 | 9/2003 | Rosenberg et al. |
| 6,831,972 B1 | 12/2004 | Malik |
| 6,839,420 B1 | 1/2005 | Koponen |
| 6,856,616 B1 | 2/2005 | Schuster et al. |
| 6,871,232 B2 | 3/2005 | Curie et al. |
| 6,999,570 B2 | 2/2006 | Alcott |
| 7,190,776 B2 | 3/2007 | Oman |
| 2002/0032765 A1 | 3/2002 | Pezzutti |
| 2003/0023523 A1 | 1/2003 | McKibben et al. |
| 2003/0045229 A1 | 3/2003 | Snelgrove et al. |
| 2003/0045267 A1 | 3/2003 | Himmel et al. |
| 2004/0010550 A1 | 1/2004 | Gopinath |
| 2004/0249927 A1 | 12/2004 | Pezutti |

\* cited by examiner

METHOD AND SYSTEM FOR TEMPORARILY PROVISIONING A TELEPHONE SERVICE FEATURE FOR A SUBSCRIBER

CROSS REFERENCE TO RELATED APPLICATIONS

This application is a continuation of, and accordingly claims the benefit from, U.S. patent application Ser. No. 10/039,153, now issued U.S. Pat. No. 7,430,289, which was filed in the U.S. Patent and Trademark Office on Jan. 3, 2002.

BACKGROUND OF THE INVENTION

1. Technical Field

The present invention relates to the field of telephony and more particularly, to a method for provisioning a telephone service feature.

2. Description of the Related Art

A public switched telephone network (PSTN) is a network that can provide local access and switching services for telephone subscribers. Local access includes the provision of a local connection point where a subscriber can connect to or access the PSTN. Switching services can include the capability to switch or route local or long distance calls that are originated or terminated by a subscriber in the PSTN. For example, there is shown in FIG. 1, a typical PSTN 100 system. The PSTN 100 system can include a switch 102, central office (CO) 104 with telephone subscriber terminals 104a, 104b, 104c and CO 106 with telephone subscriber terminals 106a, 106b and 106c. The switch 102 can be used to switch calls between CO 104 and CO 106.

Typically, the switch 102 can have the capability to switch calls originating and terminating within the same CO. For example, a call originating at subscriber terminal 104b and destined for subscriber terminal 104c can be switched by switch 102. Similarly, a call originated by subscriber terminal 104b and destined for subscriber terminal 106a can be switched by switch 102. In sophisticated CO's, the equipment present can have the capability to do intra-CO switching, which can include the switching of calls between originating and terminating subscriber terminals that are served by the same CO, without the assistance of the switch 102. For example, a call originated at subscriber 104a and destined for a subscriber terminal 104b can be switched by the CO 104, without the switch 102.

The CO can function as the local access point for subscribers. FIG. 2 illustrates a high level diagram of the CO 104 with line interface circuits (LICs). In its simplest form, CO 104 can contain a plurality of LICs, for example 122, 124. LICs are generally designed as a card having electronic components located thereon. Each LIC can provide telephone service to a single subscriber served by the CO. The LICs can be housed within an electronics cabinet 120 located at the CO. The LICs can be arranged in banks, 126, 128 to accommodate growth of the system. Each LIC can be designed as a "plug-in" card or circuit-pack that can be easily plugged or inserted into a common bus residing within the electronics frame or cabinet 120. Also housed in the electronics frame 120 is a controller 140. The controller 140 can be a special LIC that is specially configured to control the operation of all the LICs in electronics frame.

The use of "plug-in" cards or circuit-packs that are plugged into an electronics frame or cabinet having a common bus is known in the art. Whenever the need arises to provision services for a new subscriber, a new LIC card can be plugged into the common bus of the electronics cabinet 120. A twisted pair wire can then be connected to the LIC card and run from the CO to the customer/subscriber premises. At the customer premises, the twisted pair can be connected to a subscriber terminal, which is generically called a customer premises equipment (CPE). For example, LIC 122 can be connected to subscriber terminal 104a by the twisted pair wire 122a.

In operation, a subscriber utilizing subscriber terminal 104a wishing to place a call to subscriber terminal 106a can dial the directory number (DN) associated with the subscriber terminal 106a. Based on the dialed digits of the DN associated with the subscriber terminal 106a which are received at the CO 104, a call request can be dispatched to the switch 102. Based on the DN associated with the subscriber terminal 106a, the switch 100 can route the call to CO 106. The CO 106 can accordingly route the incoming call to the subscriber terminal 106a. At this point, subscriber terminal 104a is connected to subscriber terminal 106a.

Telephone service features such as, caller ID, three-way calling, call waiting, call hold, and call forwarding require provisioning. Whenever a telephone subscriber orders a new telephone service feature, the service feature has to be provisioned prior to the subscriber accessing the service. Provisioning a telephone service feature can include setting up the available resources in the telephone network and possibly at the subscriber premise to accommodate the new telephone service feature.

Typical provisioning activities can include, but are not limited to, programming the telephone service feature at a switch, and adding appropriate circuits within a telephone network such as at the CO. For example, the LIC 130 circuit-pack or card has to be provisioned at CO 104 and conduits such as twisted pair wires, coaxial cable or even a wireless connection can provide a communication path between the LIC 130 and the subscriber terminal 104c. Additionally, appropriate billing databases have to be accordingly updated. Notably, the provisioning activities typically entail dispatching a service technician to upgrade various network elements, such as the LIC card 130 at the CO 104.

The cost related to provisioning a new service feature can be prohibitively high. Instead of absorbing these prohibitively high costs, telephone service providers typically charge a connection fee to offset the costs related to provisioning a new service feature. Importantly, the charge for these service features are additional to the monthly charges paid for basic telephone service by the subscriber, irrespective of whether or not the service feature is utilized by the subscriber. Consequently, many subscribers refuse to subscribe to these new service features since it is undesirable to pay for service features that might rarely be utilized.

SUMMARY OF THE INVENTION

The invention provides a method and system for temporarily provisioning a telephone service feature. The method for temporarily provisioning a telephone service feature can include the step of identifying a telephone service feature that is to be temporarily provisioned for the duration of a call. Once identified, the telephone service feature can be activated. Upon completion of the call the activated telephone service feature can be deactivated. The step of identifying the telephone service feature can include receiving a call request that identifies the telephone service feature to be temporarily provisioned and determining whether the identified telephone service feature can be provisioned as requested.

The step of activating the telephone service feature can include the step of allocating system resources to support the identified telephone service feature. Allocation of the system resources can include, but is not limited to, allocating line interface circuits capable of providing the requested telephone service feature to a subscriber. The allocation of the system resources can further include the step of reserving a pool of resources for activating the identified telephone service feature and selecting from the reserved pool of resources, an available resource capable of processing the identified telephone service feature. The selecting step can further include the step of multiplexing the available resource onto existing telephony service in order to support the call request for the identified telephone service feature.

The step of receiving the call request can further include the step of providing a list of telephone service features to a party, in which the list can include the telephone service feature to be activated. The telephone service feature to be provisioned can be selected from the list of telephone service features provided. Exemplary telephone service feature can include, but are not limited to, a caller ID feature, a three-way calling feature, a call waiting feature, a call hold feature and/or a call forwarding feature.

The invention also provides a system for temporarily provisioning a telephone service. The system can include a controller, which can receive a call request that identifies a telephone service feature that is to be temporarily provisioned for a called subscriber terminal. The temporary provisioning of the telephone service feature can occur for the duration of a call. The controller can identify the telephone service feature that is to be temporarily provisioned.

An activator can activate the identified telephone service feature to satisfy the received call request and also deactivate the required telephone service feature upon completion of the call. The activator can include a reserved pool of communication processing circuits which can be controlled by the controller. The controller can include suitable circuitry and logic for activating and deactivating the identified telephone service feature. Each of the communication processing circuits can further include a LIC which can be controlled by the controller. The system can further include a common multiplexed bus which can connect each of the line interface circuits to a transmission conduit.

The controller can further include a multiplexer for multiplexing communication signals from the LICs onto the common multiplexed bus. The transmission conduit can connect the multiplexed bus to the called subscriber terminal and transfer the communication signals communicated between the multiplexed bus and the called subscriber terminal.

In another aspect of the invention, a system for temporarily provisioning a telephone service feature is provided. The system can include a communications controller which can receive a call request identifying a required telephone service feature to be temporarily provisioned for a called subscriber terminal. The required telephone service feature can be temporarily provisioned for the duration of a call. A pool of reserved communication processing circuits can be utilized for activating and deactivating the identified telephone service feature. A multiplexer can multiplex an available communication processing circuit selected from the pool of reserved communication processing circuits onto a transmission conduit. The transmission conduit can provide service to the called subscriber terminal.

The communications controller can further include suitable circuitry and logic that can have the capability of determining an available communication processing circuit from the pool of reserved communication processing circuits. Subsequent to determining which communication processing circuit is available, the controller can allocate the available communication processing circuit for processing the telephone service feature. The system can further include a multiplexed bus which can communicate telephony signals between each of the communication processing circuits and the called subscriber terminal through a transmission conduit. The transmission conduit can communicate the telephony signals between the multiplexed bus and the called subscriber terminal. The communication processing circuit can be a line interface circuit for providing local access service to the called subscriber terminal. The communication processor can further include suitable circuitry and logic capable of returning an allocated communication processing circuit back to the pool of reserved communication processing circuits whenever the call ends.

BRIEF DESCRIPTION OF THE DRAWINGS

There are shown in the drawings embodiments of which are presently preferred, it being understood, however, that the invention is not so limited to the precise arrangements and instrumentalities shown, wherein.

DETAILED DESCRIPTION OF THE INVENTION

Figure 1:
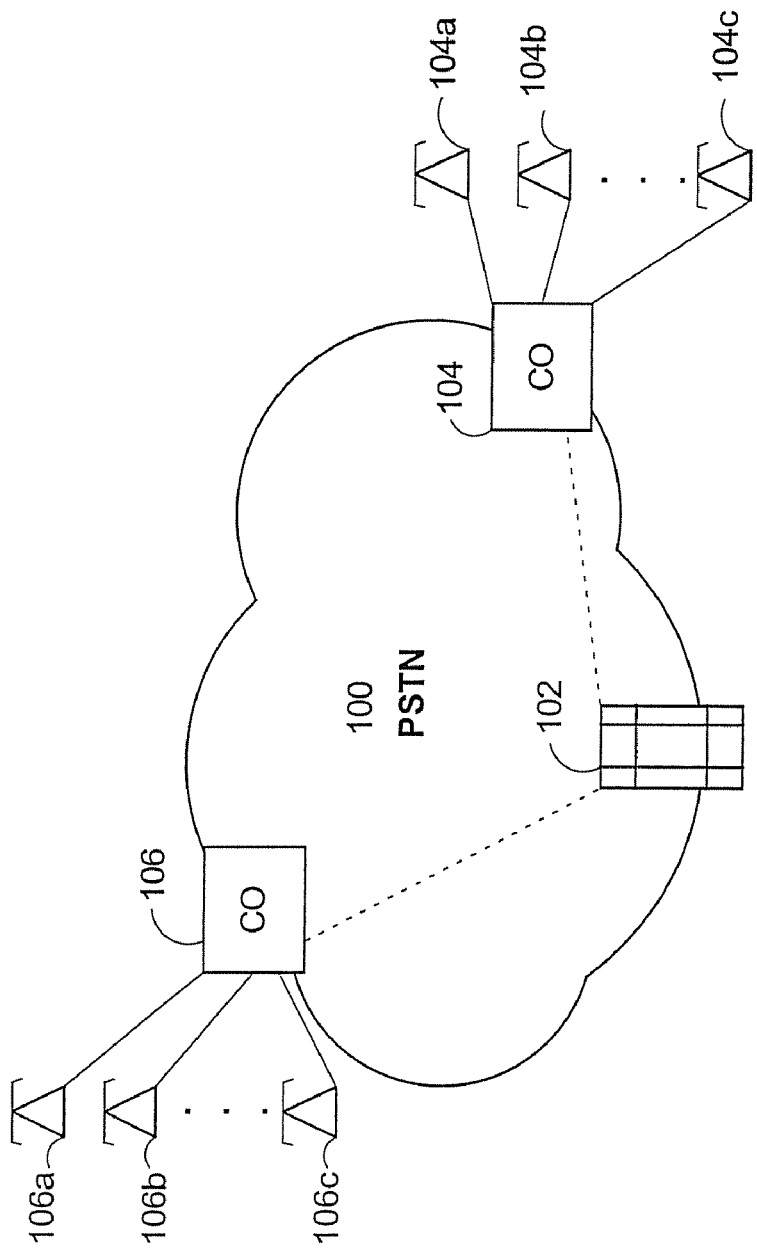
FIG. 1 illustrates a conventional PSTN system.
Figure 2:
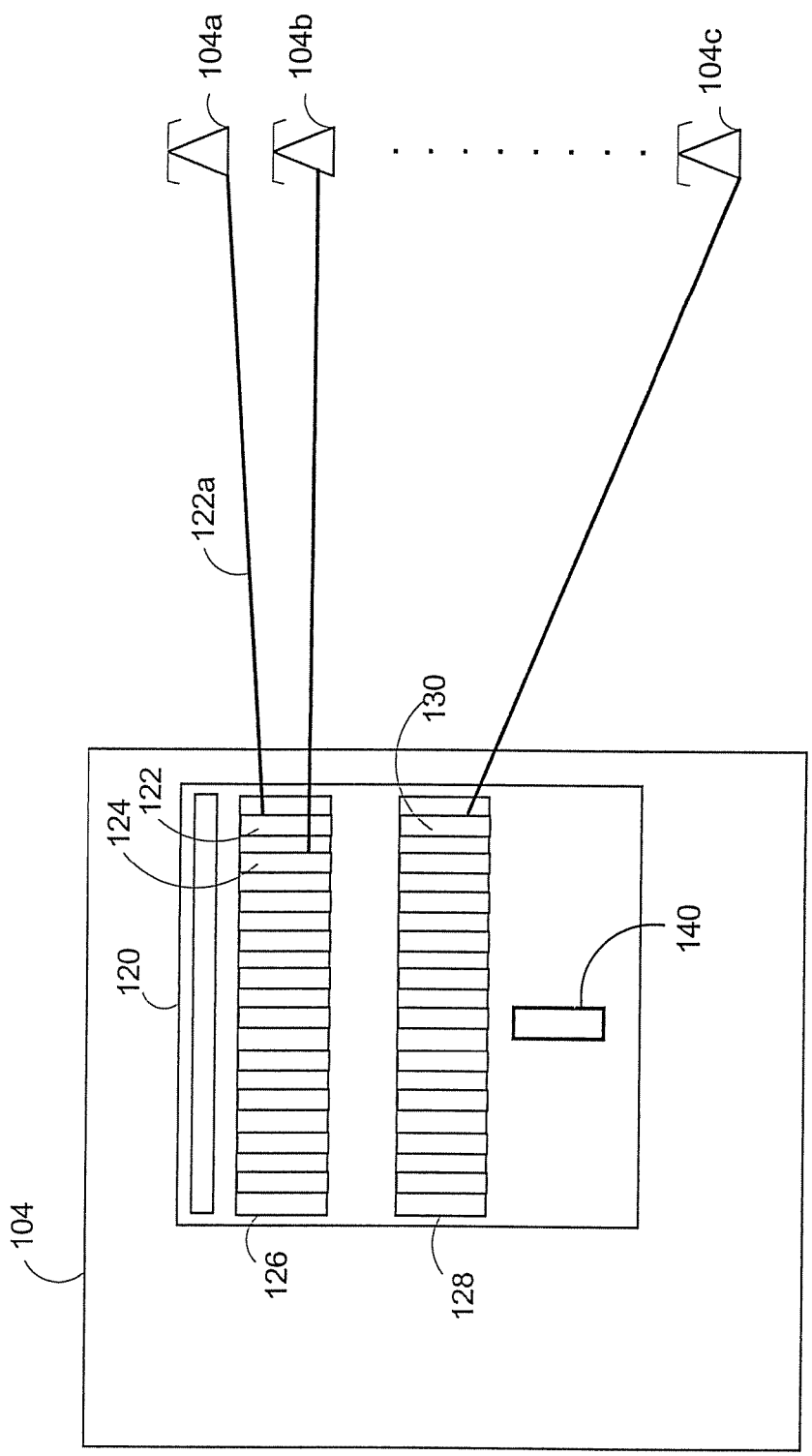
FIG. 2 illustrates an exemplary CO with LIC cards connected to the subscriber terminals in accordance with the system of FIG. 1.

The present invention is a method and system for temporarily provisioning a telephone service feature. Telephone service features can include, caller ID, three-way calling, call waiting, call-hold, call forwarding and other similar features now known or hereafter provided. The invention permits a telephone subscriber to temporarily utilize for the duration of a telephone call, a particular telephone service feature for which the telephone subscriber has not previously subscribed. To provide such temporary provisioning, a resource selected from a pool of reserved resources can be allocated and used to temporarily provision the telephone service feature for a subscriber. Specifically, reserved resources, such as a LIC, can include electronic circuits and any associated firmware or software that can provide the requested telephone service feature that is to be temporarily provisioned.

Upon termination of a telephone call, any temporarily provisioned resource can be relinquished and deallocated. Furthermore, any resource taken from the reserved pool of resources can be returned to the reserved pool of resources, where it can be subsequently allocated to facilitate future requests for temporary provisioning of a telephone service feature. Notably, by temporarily provisioning selected resources from the reserved pool of resources, there is no need to have dedicated resources for every telephone subscriber. This can result in a significant reduction in costs for telephone service providers.

In any event, it should be recognized by one skilled in the art that although the telephone service feature can be provisioned for a subscriber that has not previously subscribed to the service feature, the invention is not limited in this respect. For example, the invention could temporarily provide telephone service features to subscribers who are delinquent with payments and have only basic telephony service available and do not have enhanced service features.

As another example, a subscriber that has not subscribed to an enhanced service feature such as caller ID, can be temporarily provisioned to utilize the service feature for the duration of a single call. Similarly, a subscriber that does not currently have access to three-way calling service feature can be temporarily provisioned to utilize the service for the duration of a single incoming call. Once the call has been terminated, the temporarily provisioned service can be deactivated.

In the present invention, a call request can be received which can identify a telephone service feature to be provisioned for a particular subscriber. The call request can be a request to establish a connection with a called party and the call request can also identify the telephone service feature to be provisioned. Alternatively, the call request can be a request to specifically provision the requested telephone service feature. In any case, a determination can be made as to whether the identified telephone service feature can be provisioned based on the identity or configuration of the subscriber terminal.

If it is determined that the telephone service feature can be provisioned, the requested telephone service feature can then be temporarily activated for the duration of the call. In order to activate the requested telephone service feature, system resources can be allocated to support the identified telephone service feature. System resources can include, but are not limited to, LICs or other electronic circuits mow known or hereafter provided for offering the requested service feature to a subscriber. Upon completion of the call, the telephone service feature can be deactivated. That is, the resources allocated for the temporarily provisioned telephone service feature can be deallocated.

The allocation of system resources to support or facilitate the identified telephone service feature can include reserving a pool of resources for activating the identified telephone service feature. For example, a pool of LICs can be reserved specifically for providing temporary provisioning of a telephone service for subscribers. An available resource capable of processing the identified telephone feature can be selected from the pool of resources.

The selection of an available resource can include multiplexing the available resource onto a conduit that bears existing telephony service for the subscriber for which the telephone service is being provisioned. As a result, the temporarily activated telephone service can be provided with telephony services which the subscriber can currently access. It should be recognized that the temporary provisioning of the telephone service feature can be applicable to the called party as well as the calling party. Hence, a called or a calling party can request the telephone service feature.

Figure 3:
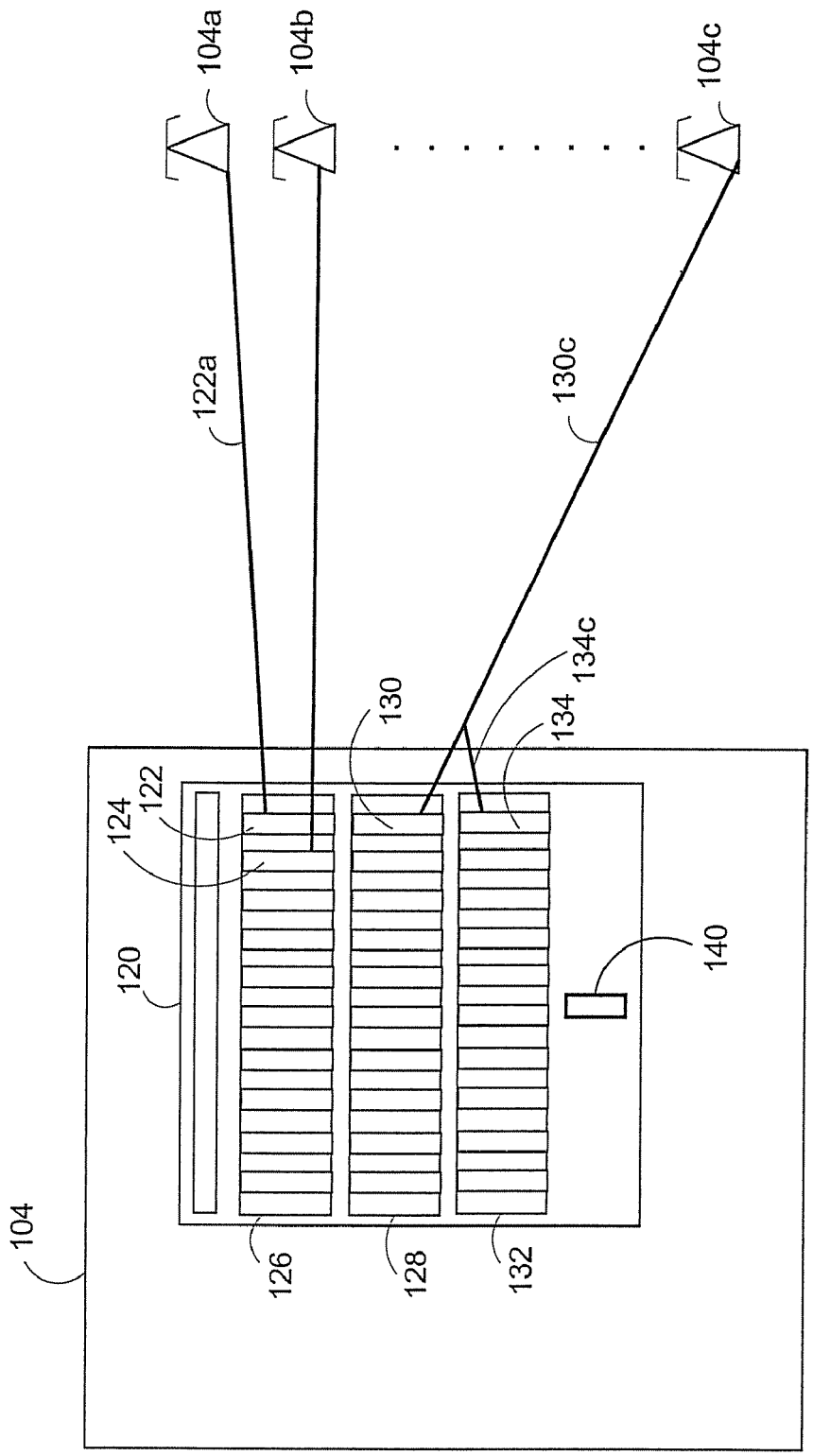
FIG. 3 illustrates an exemplary CO having a pool of reserved resources in accordance with the inventive arrangements.

FIG. 3 is a block diagram illustrating a CO 104 having a reserved pool of processing resources. Located within the CO 104 is an electronics frame or cabinet 120, which can contain banks of LICs 126, 128, which are controlled by controller 140. The use of an electronics frame or cabinet to house electronic circuits, such as LICs, is known in the art. The reserved pool of processing resources can include a bank of LIC cards 132, which can be used specifically for providing temporary provisioning of a telephone service feature.

In operation, the requested telephone service feature can be three-way calling which requires the provisioning of an additional LIC to handle the call request. In operation, upon receipt of a request to temporarily provision the three-way call waiting service feature, controller 140 can select an available LIC card from the bank of reserved LICs 132. The selected LIC can then be multiplexed onto a conduit that provides existing telephone services. For example, LIC 130 has previously been provisioned to provide local access service to subscriber terminal 104c. However, subscriber terminal 104c has not been previously provisioned to receive three-way calling.

Upon receipt of the request to temporarily provision three-way calling service for subscriber terminal 104c, LIC card 134 can be selected from the reserved bank of available resources 132. Once selected, the LIC card 134 can be marked as being unavailable or in-use. Upon termination of the call, the LIC 134 can be returned to the reserved pool of available communication links and marked as being available for use. After being selected, the LIC card 134 can then be multiplexed onto conduit 130c that was previously provisioned to provide local access service to the subscriber terminal 104c. Referring to FIG. 3, the multiplexing is illustrated by conduit 134c being connected to the already existing conduit 130c. Notwithstanding, it should be readily understood that the actual multiplexing of the communication signals can occur via the common bus within the electronics frame or cabinet 120. By multiplexing the available resource, LIC card 134 onto conduit 130c, which bears existing telephony services, the temporarily activated telephone service feature can coexists with the existing telephony services.

In accordance with the inventive arrangements, a calling party utilizing calling subscriber terminal 104a can dial a DN for called subscriber terminal 104c which is being utilized by a called party. Called subscriber terminal 104c is already connected to subscriber terminal 104b. The called party utilizing called subscriber terminal 104c does not have the call waiting telephone service feature. Upon receiving, for example a busy tone or call waiting, the calling party can enter the feature code, for example *91 or a DTMF sequence to temporarily activate three-way calling telephone service feature for the called party. The use of feature codes or DTMF sequences are well known by those skilled in the art.

Alternatively, a list of telephone service features could be provided to the subscriber and a selection made from the list. Upon activation of the service, an available LIC 134 from the reserved pool of LICs can be selected. The selected LIC can multiplex the calling subscriber terminal on to the existing conduit 130c providing service to called subscriber terminal 104c, but utilizing conduit 134c. Upon termination of the call, for example, when the calling party utilizing subscriber terminal 104a hangs up, the three-way calling service is deactivated and the LIC 134 is returned to the pool of reserved pool of resources.

Figure 4:
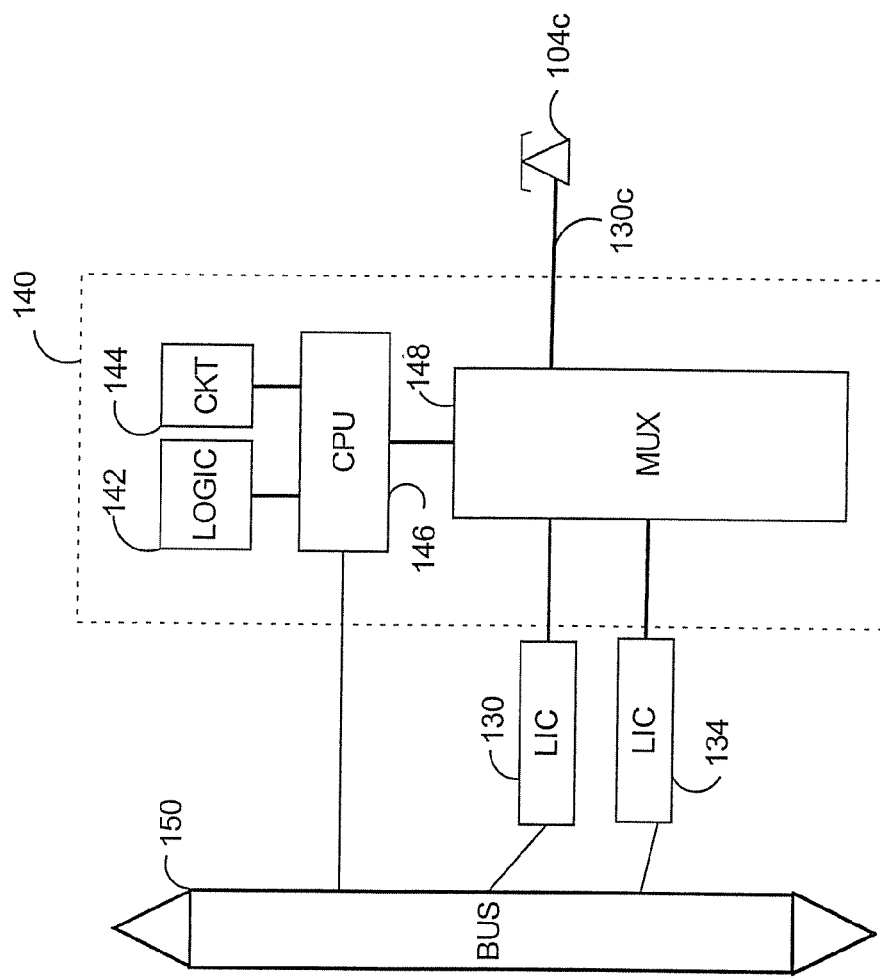
FIG. 4 illustrates an exemplary arrangement for multiplexing a LIC onto a subscriber terminal in accordance with the inventive arrangements

FIG. 4 illustrates an exemplary arrangement for multiplexing a LIC onto a subscriber terminal in accordance with the inventive arrangements. Referring to FIG. 4, there is shown a controller 140 having a multiplexer 148, a processor 146, and suitable logic and control circuitry 142, 144 respectively. LICs 130, 134 can be connected to common bus 150. The LIC 130 can be previously provisioned to provide local access service to subscriber terminal 104c. To illustrate the operation of the system depicted in FIG. 4, three-way calling telephone service feature will be used since it requires provisioning of an additional LIC. A calling party utilizing subscriber terminal 104a can dial a DN for called subscriber terminal 104c which is being utilized by a called party. Called subscriber terminal 104c is already connected to subscriber terminal 104b. The subscriber terminal 104c has not been previously provisioned for three-way calling. Since the called subscriber terminal 104c is off-hook, a busy signal will be heard at the calling subscriber terminal 104a.

A call request can be generated to initiate temporary provisioning of three-way calling. The controller 140 can receive the call request and can provide a list of telephone service features to be activated. The telephone service feature to be provisioned can be identified whenever a selection is made from the list. The list can be presented as part of a graphical user interface where a subscriber terminal has such capability. Alternatively, a voice prompt can be utilized for making the appropriate selection. Notably, feature codes or touch-tone (DTMF) sequences can define a particular telephone service feature. Once a selection has been made from the list of telephone service features, the service feature can subsequently be provisioned. The controller 140 can generate a predefined code, for example DTMF tones, which can represent the telephone service feature to be provisioned.

Once the telephone service feature to be temporarily provisioned has been identified, the activator under control of the controller 140, can activate the identified telephone service feature. Activation can occur by selecting an available communication link that has the capability to support the telephone service feature from the reserved pool of available communication links. In selecting an available communication link, the activator can assign, for example, an available LIC to facilitate the temporary provisioning of the identified telephone service feature. Notably, LIC card 134 can be an available resource which can be selected to facilitate the requested telephone service to subscriber terminal 104c.

Subsequent to selecting and assigning the available LIC 134 from the reserved pool of available LICs, CPU 146 can send a control signal instructing the multiplexer 148 to multiplex the signals from LICs 130 and 134 onto the transmission conduit 130c which connects subscriber terminal 104c. Once multiplexed, the requested telephony service feature is now temporarily provisioned for the called subscriber terminal. Upon termination of the call, the LIC 134 can be deallocated and returned to the reserved pool of LICs and LIC 130 can continue to provide local access service to subscriber terminal 104c. It should be readily understood that although the multiplexer 146 can be an internal peripheral of controller 140, the invention is not so limited. A multiplexer external to the controller 140 can be utilized without departing from the inventive concepts.

The present invention can be realized in hardware, software, or a combination of hardware and software. A method and system for temporarily provisioning a telephone service feature to a subscriber according to the present invention can be realized in a centralized fashion in one computer system, or in a distributed fashion where different elements are spread across several interconnected computer systems. Any kind of computer system, or other apparatus adapted for carrying out the methods described herein, is suited. A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which, when loaded in a computer system, is able to carry out these methods. Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

The invention claimed is:

1. A system for temporarily provisioning a telephone service feature, the system comprising:

a controller, wherein said controller is configured to
receive a call request to establish a telephone call between a calling party and a called party,
if the call request identifies one or more telephone service features, determine whether one of the telephone service features identified in the call request can be temporarily provisioned to at least one of the calling party and called party to yield at least one identified telephone service feature, and
if the call request does not identify a telephone service feature or a determination is made that the identified telephone service feature cannot be temporarily provisioned, present to at least one of the calling party and the called party a list of other telephone service features that can be temporarily provisioned to either the calling party or the called party, wherein the list is presented in at least one graphical user interface on at least one display of at least one device used by at least one of the calling party and the called party, and wherein the graphical user interface is configured to allow the at east one of the calling part and the called party to make a selection from the list to yield the identified telephone service feature; and an activator, said activator configured to
temporarily allocate telephony resources to support said identified telephone service feature, and
activate the identified telephone service feature so as to satisfy said call request and to deactivate said identified telephone service feature upon completion of said telephone call.

2. The system according to claim 1, wherein said telephony resources comprise a reserved pool of communication processing circuits controlled by said controller.

3. The system according to claim 2, wherein each of said communication processing circuits further comprises a line interface circuit for providing said identified telephone service feature.

4. The system according to claim 3, further comprising a common multiplexed bus for connecting each of said line interface circuits to a transmission conduit.

5. The system according to claim 4, wherein said controller further comprises a multiplexer for multiplexing communication signals from said line interface circuits onto said common multiplexed bus.

6. A system for temporarily provisioning a telephone service feature, the system comprising:

a communications controller for receiving a call request to establish a telephone call between a calling party and a called party,
if the call request identifies one or more telephone service features, determining whether one of the telephone service features identified in the call request can be temporarily provisioned to at least one of the calling party and called party to yield at least one identified telephone service feature, and
if the call request does not identify a telephone service feature or a determination is made that the identified telephone service feature cannot be temporarily provisioned, presenting to at least one of the calling party and the called party a list of other telephone service features that can be temporarily provisioned to either the calling party or the called party, wherein the list is presented in at least one graphical user interface on at least one display of at least one device used by at least one of the calling party and the called party, and wherein the graphical user interface is configured to allow the at least one of the calling party and the called party to make a selection from the list to yield the identified telephone service feature;
a pool of reserved communication processing circuits for activating the identified telephone service feature and for deactivating said identified telephone service feature upon completion of said telephone call; and
a multiplexer for multiplexing an available communication processing circuit from said pool of reserved communication processing circuits onto a transmission conduit providing service to said called subscriber terminal for the duration of the telephone call, said available communication processing circuit being reallocated to said pool of reserved communication processing circuits upon termination of the telephone call.

7. The system according to claim 6, wherein said communications controller further comprises circuits and program logic for determining an available communication processing circuit from said pool of reserved communication processing circuits, and allocating said available communication processing circuit for processing said identified telephone service feature.

8. The system according to claim 7, further comprising a multiplexed bus for communicating telephony signals between each of said communication processing circuits and said called subscriber terminal through a transmission conduit.

9. The system according to claim 7, wherein said communication processing circuit is a line interface circuit providing local access service to said called subscriber terminal.

10. A computer-readable storage having stored thereon, a computer program having a plurality of code sections, said code sections executable by a computer for causing the computer to perform the steps of:
receiving a call request to establish a telephone call between a calling party and a called party;
if the call request identifies one or more telephone service features, determining whether one of the telephone service features identified in the call request can be temporarily provisioned to at least one of the calling party and called party to yield an identified telephone service feature;
if the call request does not identify a telephone service feature or a determination is made that the identified telephone service feature cannot be temporarily provisioned, presenting to at least one of the calling party and the called party a list of other telephone service features that can be temporarily provisioned to either the calling party or the called party, wherein the list is presented in at least one graphical user interface on at least one display of at least one device used by at least one of the calling party and the called party, and wherein the graphical user interface is configured to allow the at least one of the calling party and the called party to make a selection from the list to yield the identified telephone service feature;
if a telephone feature is identified and can be temporarily provisioned, temporarily allocating telephony system resources to support said identified telephone service feature;
temporarily activating said identified telephone service feature for the telephone call;
deactivating said activated telephone service feature upon completion of said telephone call; and
reallocating said telephony system resources in response to completion of said telephone call.

11. The computer-readable storage according to claim 10, further comprising:
receiving another call request during the telephone call identifying at least one other telephone service feature to be temporarily provisioned for the duration of telephone call; and
determining whether said other identified telephone service feature can be provisioned within a telephony network for a call serviced by a particular exchange carrier.

12. The computer-readable storage according to claim 10, further comprising allocating line interface circuits capable of providing said identified telephone service feature to a subscriber.

13. The computer-readable storage according to claim 12, wherein said allocating step further comprises:
reserving a pool of resources for activating said identified telephone service feature; and
selecting from said reserved pool of resources, an available resource capable of processing said identified telephone service feature.

14. The computer-readable storage according to claim 13, wherein said selecting step further comprises the step of multiplexing said available resource onto existing telephony service in order to support said telephone call request for said identified telephone service feature.

15. The computer-readable storage according to claim 10, wherein said identified telephone service feature is a feature selected from the group consisting of a caller ID feature, a three-way calling feature, a call waiting feature, a call hold feature and a call forwarding feature.

* * * * *